April 24, 1934.  W. LEATHERS  1,955,967
AUTOMATIC ELECTRIC SWITCH HANDLE
Filed Feb. 8, 1932
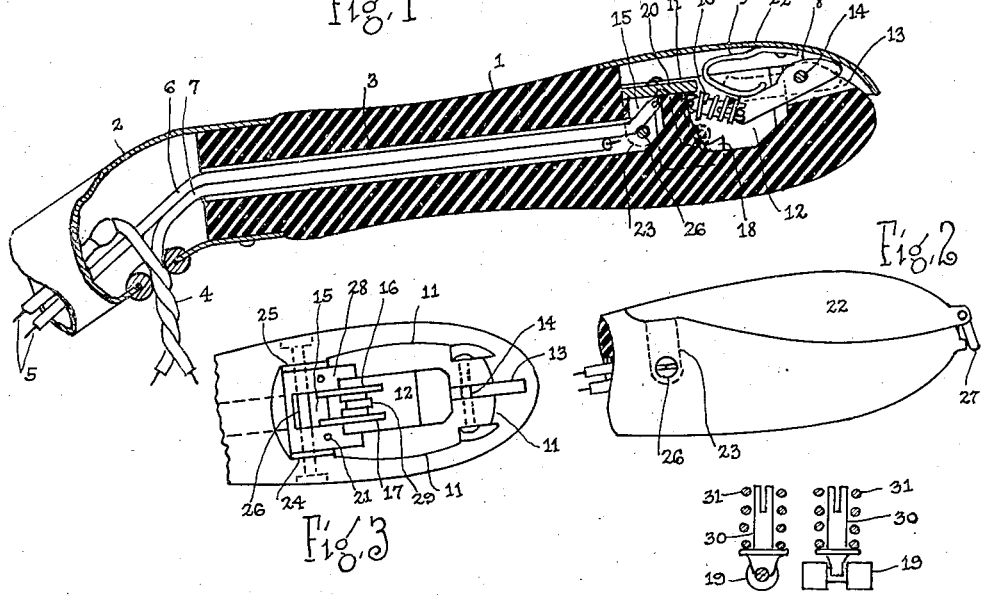
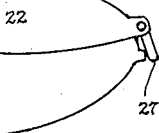
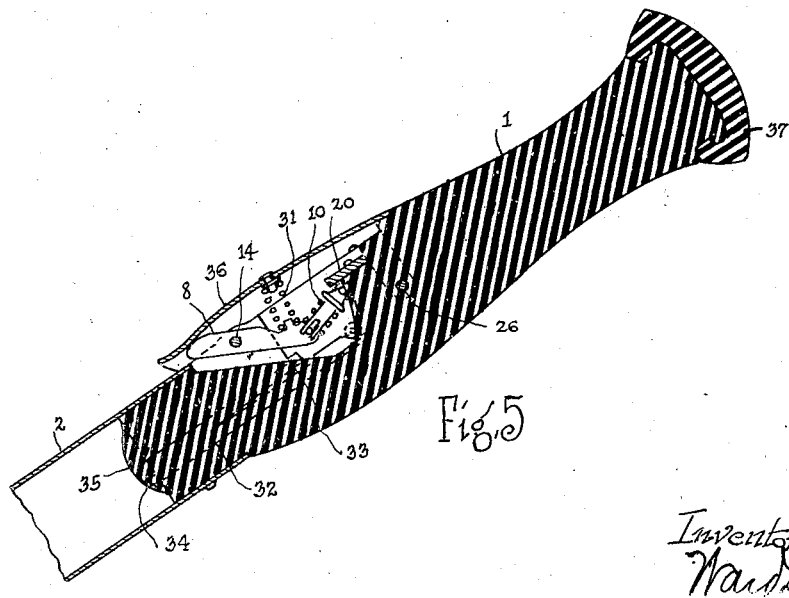
Inventor
Ward Leathers Patented Apr. 24, 1934

1,955,967

UNITED STATES PATENT OFFICE 1,955,967

AUTOMATIC ELECTRIC SWITCH HANDLE

Ward Leathers, Haworth, N. J., assignor to The Quadrex Corporation, a corporation of Connecticut Application February 8, 1932, Serial No. 591,636

1 Claim. (Cl. 200—157)

The object of my invention is to produce a handle for vacuum cleaners, electric brooms, floor polishers and the like that will operate the motor automatically.

Heretofore fixed switches have been provided on such devices and in many cases particularly vacuum cleaners with high-duty motor driven brushes and beaters have left marks on carpets where the operator has left the machine standing in one position with the motor running. This has been obviated by the use of this automatic handle.

I accomplish this object by putting the switch within the handle and designing it in such manner that a portion of the exterior of the handle conforming essentially to the shape of the handle and the fit of the hand, throws the switch on and off when the handle is squeezed or released.

A further object of my invention is to perform this function with the slightest movement of the exterior of the handle thereof and with a sufficient electrical switch-gap to meet all safety requirements.

In order to set forth the present invention so that all those familiar with these arts may understand, I have appended the following specifications to which I have appended drawing of which—

Figure 1 is a partial longitudinal cross-section of the handle.

Figure 2 is a side elevation of the end of the handle.

Figure 3 is a top or plan view of the end of the handle disassembled.

Figure 4 shows two views of the contact mechanism.

Figure 5 is a longitudinal cross-section of the handle slightly modified and adapted primarily to electric brooms.

In Figures 1, 2, and 3, a molded portion 1 is supported in a handle 2. This molded portion has through its center a suitable opening 3 through which insulated wires may be carried. The supply of current is shown at 4. The conductors 5 lead to the motor and the conductors 6 and 7 to the switch mechanism on the end of the handle.

The switch mechanism is shown cut longitudinally on the axis of the handle excepting the following parts; a lever arm 8, a return spring 9, and the roller mechanism 10 (the roller mechanism 10 is shown in detail in Figure 4). The handle molding 1 is faced off horizontally at the line 11 (see Figure 3) while a deep but narrow recess 12 in the handle provides free movement of the switch mechanism 10. A slot 13 in the handle provides free movement for the lever 8 which is hinged to the handle 1 by means of a pin 14. A somewhat central recess 15 communicates with the opening through the handle 3 so that the conductors 6 and 7 may be drawn upward therethrough. Deep slots 16 and 17 provide means of setting in flat contact members 18, (shown partially in dotted lines), only the tips of which come in contact with the switch roller 19 of the mechanism 10 when the same is in the downward position (shown in dotted lines), thereby joining electrically the conductors 6 and 7. In Figure 1, the conductor 6 is shown joined to the contact members 18 in suitable manner which is located in the slot 16 while the conductor 7 is shown broken away, since it would join a similar contact member 18 in the slot 17. A suitable insulation cap 20 is set to cover the recess 15 after the contact members 18 are in place and joined to the conductors 6 and 7. This insulated cap 20 furnishes a stop for the mechanism 10 and anchors the contact members 18 in a fixed position in their respective slots. The cap 20 may be held in place by pins or drive screws in the holes 21. The spring 9 tends to push the lever 8 to the position shown (which breaks the electric current), and also tends to raise the cover 22 to the position shown in Figures 1 and 2.

The cover 22 may be made of any desired material but I prefer to make it of a sheet metal stamping so formed that it has two hinged legs 23 which are set downward into the handle in slots 24 and 25 provided therefor. When, in the operation of the vacuum cleaner or other device to which this handle may be applied, the operator's hand presses downward on the cover 22 it turns slightly by its hinged motion on the pin 26 which passes through the handle part 1. As the cover 22 is pressed downward, it moves the top of the lever 8 downward. Such movement is amplified by lever motion on the opposite end so that the movement of the switch mechanism 10 may be amplified and a greater electrical gap thereby obtained. When the cover 22 is pressed downward a sufficient distance, the spring mechanism 10 flips into its opposite position (by means common to all toggle switches), putting the lever 8 and the roller of the mechanism 10 in the position shown in dotted lines. In such position since the roller comes in contact with two electrical contact pieces as at 18, set in the slots 16 and 17, the electrical circuit is established. When the hand is removed from the handle, the spring 9 joined to the cover 22 as by a rivet, tends to move the cover 22 upward and the lever 8 downward, thereby throwing the switch mechanism 10 into the "off" or "no current position". One of the important objects obtained is a handle exterior in no way distorted from normal handle form and yet with the slightest deformation of this exterior form, a change in the switch position is accomplished in which an ample electrical gap of say one-fourth inch may be obtained.

In Figure 2, the exterior conformation of the cover 22 is clearly shown, the legs 23 are inside the handle held by hinged pin 26 at the greatest diameter. A latch loop 27 may be provided if desired, for holding the cover down where such service is required, as for example, where attachments for vacuum cleaners are being used.

In Figure 3, the molded handle is shown from the top with all parts removed except the pins 14 and 26. The flat area on the top of the handle, is bounded by the line 11. 12 shows the deep recess into which the switch mechanism is assembled. 28 is a horizontal recess over which the cap 20 is attached. The molded portion in the center which is arcuate in shape may have as its center of radius the center of the pin 8, (see Figure 1), or other suitable radius. It consists of a center track 29 with depressions on the side thereof and parallel thereto. On this track rolls the spring-roller mechanism shown in Figure 4.

Figure 4 shows the spring-roller mechanism consisting of three parts, a roller 19, a roller pin 30, and a spring 31. These parts are common to toggle switches. The roller 19 rolls in the parallel groove on the sides of the track 29 with the tips of the roller 19 projecting over the slotted areas 16 and 17. It is therefore possible for the both ends of the roller 19 to stop against the contact pieces 18 at the bottom end of the throw.

When the lever arm 8 is turned from the position shown in Figure 1 a necessary distance, i. e., to a point just beyond a straight line between the axis 14 and the axis of the roller in the mechanism 10, the spring 31 forces the roller 19 instantaneously to the dotted position shown. The reverse actuation is similar.

In Figure 5, I have shown a mechanism similar to that of Figures 1, 2, 3, and 4. The switch however is on the other end of the handle and the handle is of such type and shown at such angle as is most desirable for an electric broom. In this figure similar numbers illustrate similar parts and the action is the same. The spring 9 (in Figure 1), is replaced by a helical spring 31 which serves a similar function. The contact pieces 18 (in Figure 1) are replaced by contact pieces 32 which may be pushed into the broom end of the molded handle 1 through slots provided therefore. These parts 32 may be slotted in the center to provide a spring action which permits of a small jaw 33 engaging the handle part 1 so that it will not pull out without being depressed. At 34 suitable means of attaching electric conductors are provided on opposite sides of a molded separator 35 which is an integral part of the handle 1. In Figure 5 the cover 36 is made in similar manner to cover 22 (in Figure 2), but is hinged in the other direction so that instead of the pressure from the palm of the operator's hand turning on the motor, such switching is accomplished by the pressure of the thumb. The molded openings in the handle are similar to those in Figure 1 but reversed in their direction. The roller of the mechanism 10 is shown in its electrical contact position in dotted lines. A molded rubber handle 37 may be provided so that if the broom is dropped on the floor, the molded handle is properly protected from injury.

Having set forth my invention in terms that all can understand, I wish it understood that many types of design may be used which will accomplish the increased leverage of switch-throw from the slightest exterior handle deformation without departing from the spirit of my invention.

I claim:—

In an automatic electric switch handle for electric appliances, a grip handle, a portion of the surface of which is formed by a cover hinged to said handle, an electrical contact roller, and a track for same, electrical contacts at one end of said track, a cooperating spring and plunger held between said roller and the inner end of a centrally fulcrumed lever, the other free end of which lever engages the inside of said cover in such manner that depressing the cover throws the contact roller from one end of said track to the other; and a spring imposed between the inner end of said lever and said cover for purposes of returning the cover and the roller to a normal no-current position.

WARD LEATHERS.